(12) United States Patent
Ganschow et al.

(10) Patent No.: US 7,147,703 B2
(45) Date of Patent: Dec. 12, 2006

(54) PIGMENT FINISHING BY MICROWAVE HEATING

(75) Inventors: Matthias Ganschow, Wiesbaden (DE); Carsten Plueg, Seeheim-Jugenheim/Ober-Beerbach (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 11/229,464

(22) Filed: Sep. 16, 2005

(65) Prior Publication Data

US 2006/0060111 A1 Mar. 23, 2006

(30) Foreign Application Priority Data

Sep. 18, 2004 (DE) ............ 10 2004 045 389

(51) Int. Cl.
C09B 67/50 (2006.01)
C09B 48/00 (2006.01)
C09B 27/00 (2006.01)
C08K 5/00 (2006.01)

(52) U.S. Cl. .......... 106/493; 106/410; 106/411; 106/412; 106/494; 106/495; 106/496; 106/497; 106/498

(58) Field of Classification Search .......... 106/410, 106/412, 413, 493, 494, 495, 496, 497, 498, 106/411
See application file for complete search history.

(56) References Cited

U.S. PATENT DOCUMENTS 4,478,643 A * 10/1984 Kuwahara et al. ........ 106/410
5,190,585 A * 3/1993 McCrae et al. ............ 106/493
5,472,495 A * 12/1995 Schroeder .................. 106/493
6,031,100 A * 2/2000 Badejo ....................... 546/49
6,491,796 B1 12/2002 Hu et al.

FOREIGN PATENT DOCUMENTS

EP 0905199 3/1999

OTHER PUBLICATIONS

Lidstrom et al. "Microwave Assisted Organic Synthesis a Review," Tetrahedron 57, pp. 9225-9284, (2001).
Shaabani, "Synthesis of Mettalophthalocyanines Under Solvent-Free Conditions Using Microwave Irradiation," J. Chem. Research (5) pp. 672, 673 (1998).
Ungurenaso, "Improved Synthesis of Octaalkoxymetalphthalocyaninos ($MCl_2$, $M \subset Si$, Ge, Sn) Under Microwave Conditions," Synthesis 10, pp. 1729, 1730 (1999).

* cited by examiner

Primary Examiner—Anthony J. Green
(74) Attorney, Agent, or Firm—Anthony A. Bisulca

(57) ABSTRACT

The invention relates to a process for aftertreating organic pigments which comprises heating the unground or ground organic crude pigment in water and/or organic solvents by means of microwave irradiation, under pressure if desired, so that the mass temperature of the mixture reaches 30 to 250° C.

12 Claims, No Drawings

PIGMENT FINISHING BY MICROWAVE HEATING

The present invention is described in the German priority application No. 102004045389.6, filed Sep. 18, 2004, which is hereby incorporated by reference as is fully disclosed herein.

The present invention is sited within the field of organic chromatic pigments.

It is known that organic pigments, especially azo pigments, precipitate from the synthesis solution into small, insoluble particles (primary crystallites) which additionally require an aftertreatment (finish). In the course of such treatment it is necessary to alter physical properties, such as crystal morphology, crystal phase, crystal size and quality, and particle-size distribution, in the direction of a desired optimum. The reason for this is that, if a crude pigment presscake is dried directly after synthesis and washing, the primary particles often congregate to a considerable extent to form agglomerates and aggregates. This leads to harsh-textured, difficult-to-disperse pigments which are weak in color and which often can no longer be brought even by grinding into a form in which they can be used in a technical application.

Polycyclic pigments generally precipitate from the synthesis solution as coarsely crystalline crude pigments, which must be subsequently finely divided by suitable methods, such as grinding, for example. In the majority of cases the prepigments thus obtained likewise require an aftertreatment in order to achieve the desired physical properties.

The usual pigment finish is a thermal aftertreatment, involving prolonged heating of the crude pigment suspension or of the pigment presscake, washed to remove salts, isolated, and pasted up again, in organic solvents at relatively high temperatures for the purpose of improving crystal formation. It reduces the ultrafine fraction, which is responsible particularly for the agglomeration tendency of the pigments, and accordingly achieves a narrower particle-size distribution.

In finishing processes which have been customary to date the pigment is heated usually in organic solvents for a prolonged time at high temperatures; as a result, yield losses are likely in some cases, owing to degradation reactions on the part of the pigment. In some cases, moreover, solvents are employed which are objectionable from a health standpoint, such as alcohols, glacial acetic acid, chlorobenzene, o-dichlorobenzene, N-methylpyrrolidone, dimethyl sulfoxide, and dimethylformamide. Because organic solvents are usually combustible, furthermore, appropriate measures must be taken for plant safety.

The object of the present invention was to provide a gentler finishing process for organic pigments, which is superior to the hitherto customary thermal solvent finish in terms of safety and environmental compatibility.

Microwave radiation has been found an effective, alternative medium for the heating of various solvents, as described for example in P. Lidström et al., Tetrahedron 2001, 57, 9225–83.

The synthesis of various substituted and unsubstituted metal phthalocyanines under microwave irradiation is described inter alia in the references A. Shaabani et al., J. Chem. Res. 1998, 672–3 and C. Ungurenasu et al., Synthesis 1999, 10, 1729–30, and in U.S. Pat. No. 6,491,796. A conversion (finish) of the resultant crude pigment into a material with defined morphology and crystal phase is not described.

EP 0 905 199 describes the synthesis of quinacridones under microwave heating, but where the finishing step is carried out after the isolation of the crude pigment by known methods with conventional heating.

It has surprisingly been found that by means of microwave irradiation it is possible to shorten considerably the treatment time of the pigment finish in water and/or organic solvents, preferably only in water, in comparison to conventional methods and that it therefore represents a gentle process for finishing pigments.

The present invention accordingly provides a process for aftertreating (finishing) organic pigments which comprises heating the unground or ground, organic crude pigment in water and/or organic solvents by means of microwave irradiation, under pressure if desired, so that the mass temperature of the mixture reaches 30 to 250° C.

The procedure here is advantageously such that the crude pigment suspension obtained after the pigment synthesis or after a fine division, by grinding, for example, is filtered, washed, dried to form the crude powder pigment, admixed with the corresponding solvent (water and/or organic solvents), and exposed to microwave irradiation.

Instead of the dried crude powder pigment it is also possible to use a water-moist or solvent-moist crude pigment, such as a filtercake or presscake for example. An alternative possibility is to use the crude pigment suspension obtained from the synthesis.

Into the suspension of the crude pigment it is additionally possible to insert, if desired, auxiliaries, such as surfactants, nonpigmentary and pigmentary dispersants, shading colorants or rheology control additives.

The process can be operated batchwise or continuously.

The microwave frequencies used may be situated within a range from 500 MHz and 25 GHz (25 000 MHz). Frequencies of 915, 2450, 5800 and 22125 MHz are currently used in industry and research for heating and drying, preference being given to using a frequency of 2450 MHz. The energy stages of suitable microwave ovens are typically between 800 and 5000 W. Higher and lower energy inputs, however, can also be used. The energy to be input must be adapted to the reaction cells that are used in each case.

A time sufficient for aftertreatment is usually 0.5 to 30 min, preferably 1 to 20 min, in particular 2 to 10 min, in order to ensure the successful outcome in accordance with the invention. Longer periods of irradiation, though naturally possible, are uneconomic.

Although high temperatures may be generated by the irradiation of the invention, for example of up to 250° C., preferably 50 to 200° C., the thermal load is low as a result of the short application.

Where operation takes place under pressure it is possible to set pressures of up to 40 bar, preferably 2 to 10 bar.

The finishing medium preferred in accordance with the invention is water, with an acidic or alkaline pH if desired. It is however, also possible to use mixtures of water with organic solvents, as specified above, or only organic solvents.

The aftertreatment of the invention can be performed on all organic chromatic pigments, such as azo pigments and polycyclic pigments. Azo pigments may be monoazo, disazo, disazo condensation, naphthol or metal complex pigments.

Particularly suitable azo pigments include C.I. Pigment Yellow 16, 32, 83, 97, 120, 151, 154, 155, 175, 180, 181, 191, 194, 213, 214, Pigment Orange 34, 36, 38, 62, 72, 74, Pigment Red 53:2, 112, 122, 137, 144, 170, 171, 175, 176, 185, 187, 188, 208, 214, 242, 247, 253; Pigment Violet 32; Pigment Brown 25.

Polycyclic pigments may be, for example, isoindolinone, isoindoline, anthanthrone, thioindigo, quinophthalone, anthraquinone, dioxazine, phthalocyanine, quinacridone, perylene, perinone, diketopyrrolopyrrole, thiazoindigo, and azomethine pigments, especially Pigment Violet 19, 23, Pigment Blue 15, Pigment Green 7, 36, 37, Pigment Red 122, 254, 264, and Pigment Yellow 139.

It has been found that the aftertreatment of the invention is able to replace the hitherto customary solvent finish. Furthermore, with some pigments, depending on temperature, pressure, treatment time, and solvent, further physical properties may change, surprisingly, such as the crystal modification or the ratio of the crystal modifications formed.

For example, from crude P.R. 170 in the α phase, the aftertreatment of the invention in water produces after a very short time a finished P.R. 170 having a very high fraction of the valuable β phase.

Aftertreatment in NMP of the reddish brown crude pigment P.Y.213 in the β phase, in accordance with the invention, produces after a very short residence time of 1.3 minutes P.Y.213 in a clean, yellow α phase. In comparison to the initial β-phase pigment, which is reddish brown in color and is difficult to disperse in an AM 5 varnish, the resultant products (α phase) are yellow and readily dispersible and are suitable, for example, for producing metallic paints.

EXAMPLES 1 TO 5

A suspension of 2.5 g P.R. 170 (α phase) in 47.5 ml of water was changed to a 100 ml Teflon pressure autoclave and heated in a microwave from MLS GmbH (MLS 1200 mega, 2450 MHz) under the antogenous pressure. The maximum energy irradiated during the heating of the pigment suspension was 1000 W and was regulated accordingly by the microwave when the desired temperature was reached (Table 1). After the autoclave had been cooled and let down, the aqueous pigment suspension obtained was filtered and the solid product was washed with 200 ml of water and dried in a vacuum drying oven at 80° C. for 15 hours.

The finishing conditions were varied in accordance with Table 1 below:

| Ex. No. | Finishing conditions | | Crystal phase |
| | t[min] | T[° C.] | Main/secondary phases |
| --- | --- | --- | --- |
| | — | — | untreated α phase |
| 1 | 10 | 100 | Mixture of α and β phase |
| 2 | 10 | 130 | β phase |
| 3 | 20 | 130 | β phase, small fractions of γ phase |
| 4 | 10 | 180 | β phase, small fractions of γ phase |
| 5 | 20 | 180 | β phase, distinct fractions of γ phase |

By the α phase of P.R. 170 is meant the crystal modification distinguished by the following characteristic lines in the X-ray powder diagram (Cu-K$_\alpha$ radiation, 2Φ values in degrees): 7.6 (strong), 25.7 (strong), 5.2, 8.2, 11.7, 13.5, 15.9, 18.9, 23.5 (all moderate).

By the β phase is meant the crystal modification of P.R.170 which is distinguished by the following characteristic lines in the X-ray powder diagram: 25.5 (strong), 7.1, 8.2, 11.3, 12.8, 15.1, 17.9 (all weak).

The γ phase is distinguished by the following lines: 25.7 (strong), 7.3, 11.3, 12.9, 15.4, 18.2 (all moderate).

All line positions of all modifications of all pigments carry an uncertainty of ±0.2°.

EXAMPLES 6 TO 10

150 g of reddish brown crude pigment P.Y. 213 (β phase) were stirred in 1350 g of NMP at room temperature for two hours. The suspension obtained was then pumped continuously through a continuous-flow microwave reactor from MLS GmbH (MLS ETHOS contFLOW, 2450 MHz) (quartz tube reactor having a diameter of 5 cm and a volume of 120 cm$^3$, with stirring). The maximum energy irradiated was 1000 W and was regulated accordingly by the microwave when the desired temperature was reached (Table 2). After departing the reactor, the pigment suspension was cooled immediately to 40° C. by a cooling system and filtered and the solid product was washed with water and dried in a vacuum drying oven at 80° C. for 15 hours.

The finishing conditions were varied in accordance with Table 2 below:

| Ex. No. | Finishing condtions | | Crystal phase |
| | Residence time t[min] | T[° C.] | Main/secondary phases |
| --- | --- | --- | --- |
| | — | — | untreated β phase |
| 6 | 1.3 | 130 | α phase |
| 7 | 2.25 | 130 | α phase |
| 8 | 2.25 | 160 | α phase |
| 9 | 4.5 | 160 | α phase |
| 10 | 4.5 | 200 | α phase |

The crystallinity of the samples increases from Example 6 to Example 10.

In comparison to the β-phase pigment, which is reddish brown in color and is difficult to disperse in an AM 5 varnish, the resultant products (α phase) are yellow and readily dispersible and are suitable, for example, for producing metallic paints.

By the yellow α phase of P.Y. 213 is meant the crystal modification distinguished by the following characteristic lines in the X-ray powder diagram (Cu—K$_\alpha$ radiation, 2Φ values in degrees): 9.2, 26.6 (strong), 6.4, 7.5, 10.5, 12.9, 15.1, 16.1, 16.8, 17.2, 17.6, 19.3, 19.5, 21.3, 21.6, 21.8, 22.9, 23.9, 24.6, 25.4, 26.1, 26.9, 27.8, 29.1, 30.1 (all weak).

By the reddish brown β phase is meant the crystal modification of P.Y.213 which is distinguished by the following characteristic lines in the X-ray powder diagram: 3.3, 8.0 (strong), 8.8, 16.1, 26.4 (moderate), 6.5, 9.9, 11.0, 12.4, 13.1, 13.6, 14.7, 16.7, 17.9, 18.8, 19.8, 22.6, 24.3, 27.7, 28.9 (all weak).

All line positions of all modifications of all pigments carry an uncertainty of ±0.2°.

EXAMPLES 11 TO 15

A suspension of 5 g reddish brown crude pigment P.Y. 213 (β phase) in 45 ml of water was charged to a 100 ml Teflon pressure autoclave and heated in a microwave from MLS GmbH (MLS 1200 mega, 2450 MHz) under the autogenous pressure. The maximum energy irradiated during the heating of the pigment suspension was 1000 W and was regulated accordingly by the microwave when the desired temperature was reached (Table 3). After the autoclave had been cooled and let down, the aqueous pigment suspension obtained was filtered and the solid product was washed with 200 ml of water and dried in a vacuum drying oven at 80° C. for 15 hours.

The finishing conditions were varied in accordance with Table 3 below:

| Ex. No. | Finishing conditions | | Crystal phase |
| --- | --- | --- | --- |
| | t[min] | T[° C.] | Main/secondary phase |
| | — | — | untreated β phase |
| 11 | 5 | 160 | α phase |
| 12 | 10 | 160 | α phase |
| 13 | 20 | 160 | α phase |
| 14 | 10 | 190 | α phase |
| 15 | 20 | 190 | α phase |

The crystallinity of the samples increases from Example 11 to Example 15.

In comparison to the β-phase pigment, which is reddish brown in color and is difficult to disperse in an AM 5 varnish, the resultant products (α phase) are yellow and readily dispersible and are suitable, for example, for producing metallic paints.

What is claimed is:

1. A process for aftertreating an organic pigment comprising the steps of providing a mixture of an unground or ground organic crude pigment in a carrier and heating the mixture by microwave irradiation to achieve a mass temperature of the mixture, wherein the mass temperature of the mixture reaches 30 to 250° C., and wherein the carrier is water, an organic solvent or a mixture thereof, wherein the process results in a pigment having a defined morphology and crystal phase.

2. The process as claimed in claim 1, wherein the carrier is water.

3. The process as claimed in claim 1, wherein the heating step is carried out continuously.

4. The process as claimed in claim 1, wherein the heating step has a duration and wherein the duration is 0.5 to 30 min.

5. The process as claimed in claim 1, wherein the heating step has a duration and wherein the duration is 2 to 10 min.

6. The process as claimed in claim 1, wherein the microwave irradiation has a frequency of 2450 MHz.

7. The process as claimed in claim 1, wherein the organic crude pigment is an azo pigment or a polycyclic pigment.

8. The process as claimed in claim 1, wherein the organic crude pigment is an azo pigment and wherein the azo pigment is a monoazo, disazo, disazo condensation, naphthol or metal complex pigment.

9. The process as claimed in claim 1, wherein the organic crude pigment is an azo pigment, and wherein the azo pigment is C.I. Pigment Yellow 16, 32, 83, 97, 120, 151, 154, 155, 175, 180, 181, 191, 194, 213, 214, Pigment Orange 34, 36, 38, 62, 72, 74, Pigment Red 53:2, 112, 122, 137, 144, 170, 171, 175, 176, 185, 187, 158, 208, 214, 242, 247, 253; Pigment Violet 32; or Pigment Brown 25.

10. The process as claimed in claim 1, wherein the crude organic pigment is a polycyclic pigment, and wherein the polycyclic pigment is an isoindolinone, isoindoline, anthanthrone, thioindigo, quinophthalone, anthraquinone, dioxazine, phthalocyanine, quinacridone, perylene, perinone, diketopyrrolopyrrole, thiazoindigo or azomethine pigment.

11. The process as claimed in claim 1, wherein the organic crude pigment is C.I. Pigment Violet 19, 23, Pigment Blue 15, Pigment Green 7, 36, 37, Pigment Red 122, 254, 264 or Pigment Yellow 139.

12. The process as claimed in claim 1, wherein the heating step occurs under pressure.

* * * * *